US005329964A

United States Patent [19]

Derezinski

[11] Patent Number: 5,329,964
[45] Date of Patent: Jul. 19, 1994

[54] CRISS-CROSS HOPPER INCLUDING NON-CONTACTING INSERTS

[75] Inventor: Stephen J. Derezinski, Penfield, N.Y.

[73] Assignee: Eastman Kodak Company, Rochester, N.Y.

[21] Appl. No.: 118,701

[22] Filed: Sep. 9, 1993

[51] Int. Cl.[5] .............................................. B05C 5/02
[52] U.S. Cl. .................................. 137/561 A; 118/410; 425/467
[58] Field of Search ................... 137/561 R, 561 A; 425/461, 467, 382.4; 118/410, 411, 419

[56] References Cited

U.S. PATENT DOCUMENTS

| | | | |
|---|---|---|---|
| 2,197,988 | 4/1940 | Tanzi | 107/14 |
| 2,734,224 | 2/1956 | Winstead | 137/561 A X |
| 3,074,106 | 1/1963 | Eberman | 18/12 |
| 3,815,637 | 6/1974 | Carrow | 425/461 X |
| 4,017,240 | 4/1977 | Nelson | 425/192 |
| 4,113,411 | 9/1978 | Terragni | 425/394 |
| 4,142,010 | 2/1979 | Pipkin | 427/355 |
| 4,256,140 | 3/1981 | Swaroop et al. | 137/561 A |
| 4,299,553 | 11/1981 | Swaroop | 137/561 A |
| 4,333,629 | 6/1982 | Roy | 137/561 A X |
| 4,344,907 | 8/1982 | Herrington | 264/173 |
| 4,372,739 | 2/1983 | Vetter et al. | 425/467 X |
| 4,411,614 | 10/1983 | Feathers | 425/466 |
| 4,552,521 | 11/1985 | Linnstaedter | 425/131 |
| 4,572,435 | 2/1986 | Thompson | 137/561 A X |
| 4,619,802 | 10/1986 | Cloeren | 264/171 |
| 4,653,994 | 3/1987 | Capelle | 425/131.1 |
| 4,789,513 | 12/1988 | Cloeren | 264/171 |
| 4,826,422 | 5/1989 | Hunter | 425/461 |
| 4,919,605 | 4/1990 | Kousai et al. | 425/467 |
| 5,059,371 | 10/1991 | Saheki et al. | 264/108 |
| 5,067,432 | 11/1991 | Lippert | 118/413 |
| 5,259,751 | 11/1993 | Chen | 425/467 X |

Primary Examiner—John Rivell
Attorney, Agent, or Firm—Carl F. Ruoff

[57] ABSTRACT

The present invention is a criss-cross flow hopper which provides even fluid distribution. The flow hopper includes the first and second hopper half each having a planar surface and a cavity which cooperate to form an inner chamber and an exit slot. A first and second insert are securable to each hopper half in the cavity. These non-contacting inserts form within the chamber first and second half flow slots which direct fluid away from the exit slot but then the fluid combines in a damping chamber bounded by the inserts. The fluid is then directed to the exit slot to the substrate to be coated.

6 Claims, 4 Drawing Sheets

CRISS-CROSS HOPPER INCLUDING NON-CONTACTING INSERTS

FIELD OF THE INVENTION

The present invention relates to coating hoppers and more particularly to an apparatus for achieving uniform flow distribution in coating hoppers.

BACKGROUND OF THE INVENTION

In conventional coating hoppers, including those used for supplying photographic emulsions, material flow into the hopper is either center fed or end fed. In both flow patterns, achieving adequate widthwise flow distribution is a problem. To accomplish adequate widthwise flow distribution, contouring of the manifold and lips is often provided. The contouring is needed to offset the pressure loss which occurs between the inlet in the far end of the manifold. Properly done, the method is adequate for a specific set of fluids and flow conditions. However, a change in flow conditions or fluids will typically alter the pressure relationship in the manifold and create unacceptable flow distribution.

Rather than contouring the manifold, a different flow path or flow circuit has been shown to evenly distribute the pressure of the fluid. One such flow circuit is a criss-cross circuit. However, the added complexity of the passages needed in the hopper body requires special methods of hopper construction which include maintaining the mechanical stability of the delivery slot.

Prior art attempts to solve the above problem are disclosed in U.S. Pat. Nos. 4,344,907; 4,552,521; 4,619,802 and 4,789,513. Each of the aforementioned references disclose the use of inserts for a dye for the purpose of combining two or more materials. However, none of these patents teach improvements in total flow uniformity. Other patents, for example U.S. Pat. Nos. 4,017,240; 4,411,614 and 4,826,422 each use some sort of insert to achieve flow uniformity of a single stream. However, the '240 and '614 references do not show appreciation for the specific problem faced by the applicant because they teach branching the flow into various channels which all empty into a final damping cavity. The '422 patent achieves its results by branching the flow into layers that overlap when they recombine in the damping cavity.

Furthermore, U.S. Ser. No. 08/098,179 filed Jul. 28, 1993 teaches the use of inserts to achieve uniform flow in a criss-cross hopper. However, the inserts used in this hopper can affect the gauging of the delivery slot.

Accordingly, the present invention presents an apparatus for achieving uniform flow distribution in a criss-cross hopper while providing a final slot dimension that is very accurate, even after repeated disassembly and reassembly.

SUMMARY OF THE INVENTION

The present invention describes a criss-cross flow hopper which includes a first hopper half having a first planar surface, the planar surface adjoining a first cavity having an exit end and an entrance end, the cavity having a first widthwise flow distribution channel positioned between the entrance end and the exit end. A second hopper half is included which has a second planar surface, the planar surface adjoining a second cavity having an exit end and an entrance end, the cavity having a second widthwise flow distribution channel positioned between the entrance end and the exit end wherein the first and second hopper halves cooperate to form an exit slot bounded by the first and second planar surfaces and a chamber bounded by the first and second cavities. A first insert is provided which is securable to the first cavity at a position between the exit end the first widthwise distribution channel. A second insert is provided which is securable to the second cavity at a position between the exit end and the second widthwise distribution channel wherein the first and second hopper halves and the first and second inserts cooperate to form a damping chamber bounded by said first and second inserts which do not contact each other and in fluid communication with the exit slot wherein when liquid flows through said first and second widthwise distribution channels, the liquid is directed toward the entrance end through the damping chamber and through the exit slot.

For a better understanding of the present invention, together with other advantages and capabilities thereof, reference is made to the following detailed description and appended claims in connection with the above-described drawings.

DETAILED DESCRIPTION OF THE PREFERRED EMBODIMENTS

The complexity of the criss-cross flow circuit for even distribution of fluid requires inserts in the hopper or the dye cavity if the hopper is to be made of only two halves. The hopper constructed of two halves is very desirable from the standpoint of gauging of the final slot; accurate gauging of the final slot is a critical component in making uniform coatings. The current method for providing inserts requires that inserts form part of the gauging land area. As such repeated removal, for example, for cleaning the hopper, as this repeated disturbance would eventually destroy the very fine precision required for the final slot (25 micro inch uniformity).

Removable inserts made of rubber or Teflon have been suggested in U.S. Ser. No. 08/098,179 filed Jul. 28, 1993 as an alternative which will not affect the gauging of the final slot. The soft rubber or Teflon can be clamped in the inner cavity at low enough forces to not greatly affect the gauging of the final slot. However, the inner slot formed by the inserts will not be as accurate and some disruption of the gauging is inevitable.

Figure 1:
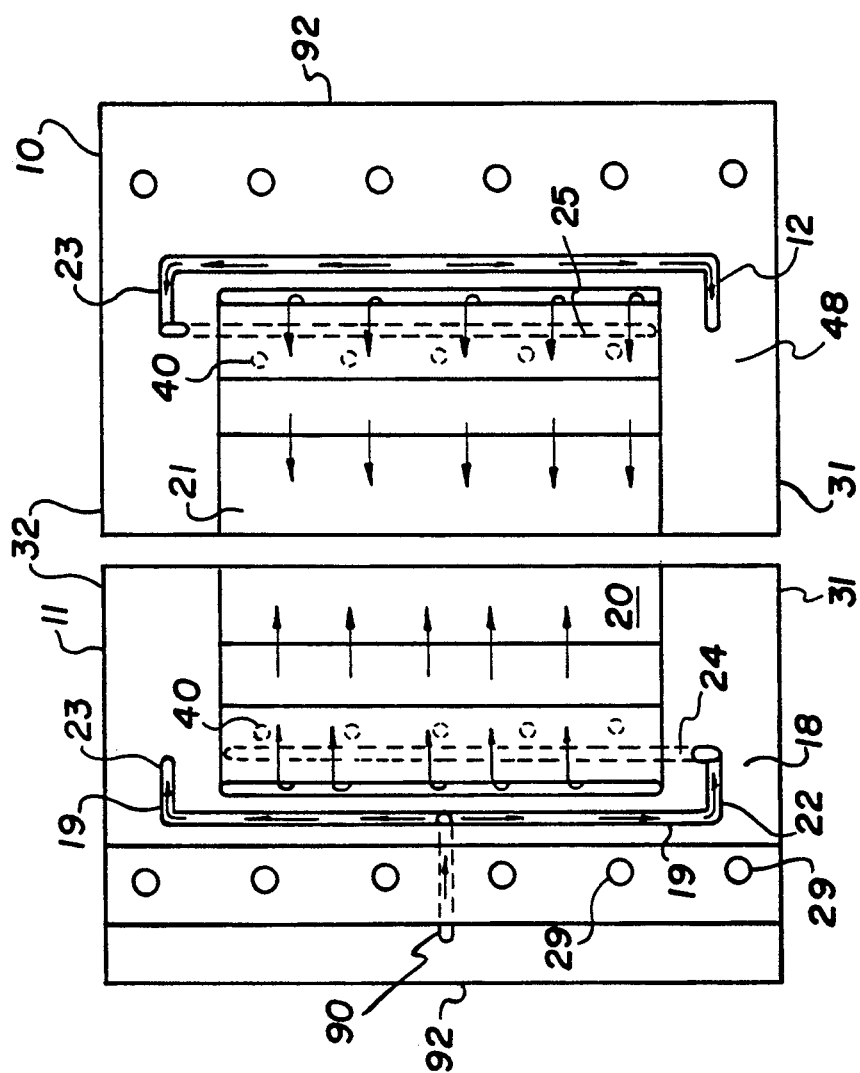
FIG. 1 shows a face view of the cover and body halves of the hopper of the present invention.
Figure 2:
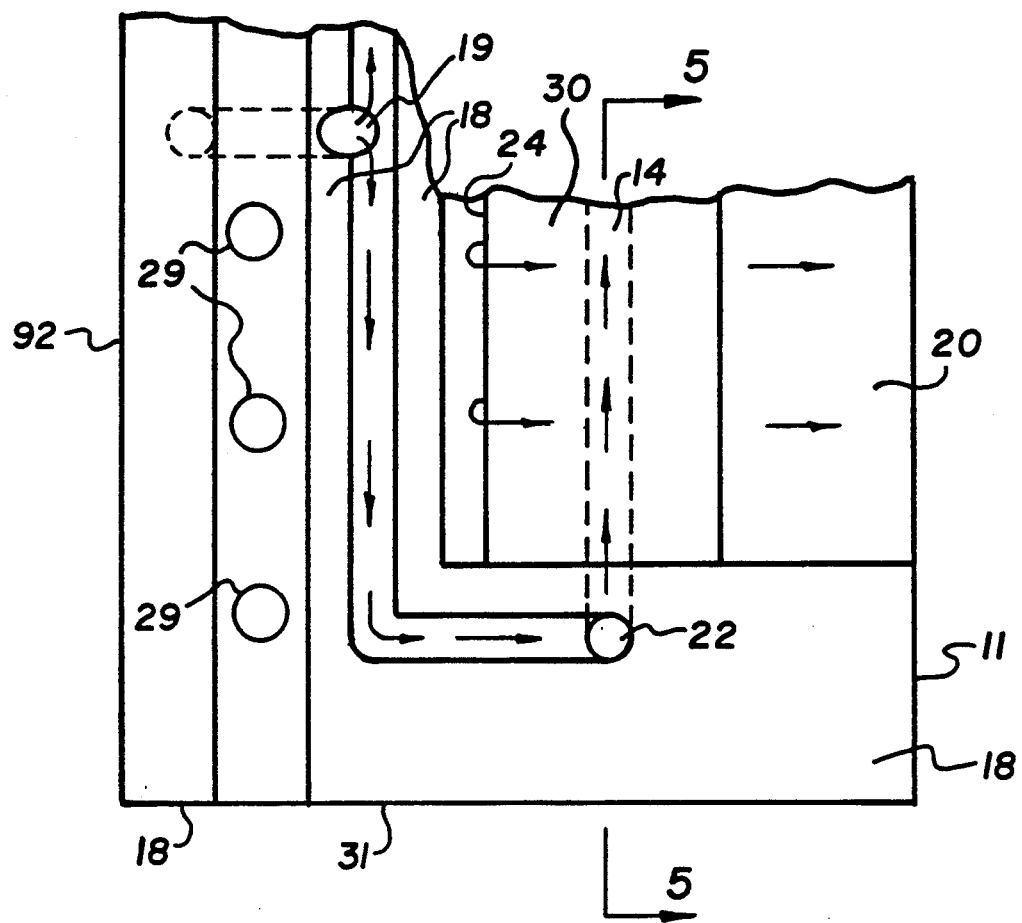
FIG. 2 shows an enlarged face view of the partial body-half of the hopper of the present invention.
Figure 3:
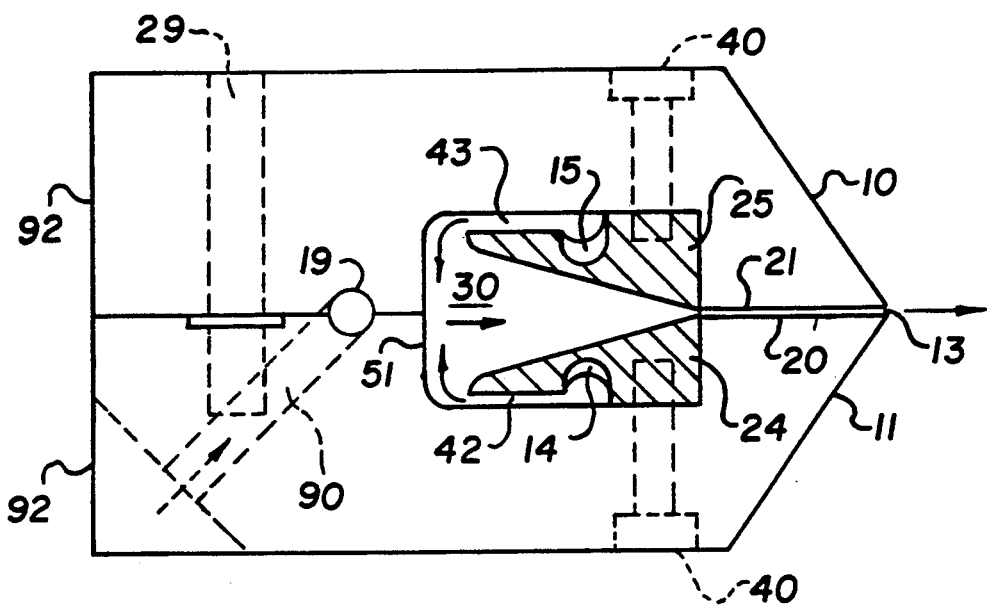
FIG. 3 is a sectional view of the hopper containing the non-contacting inserts of the present invention.
Figure 4:
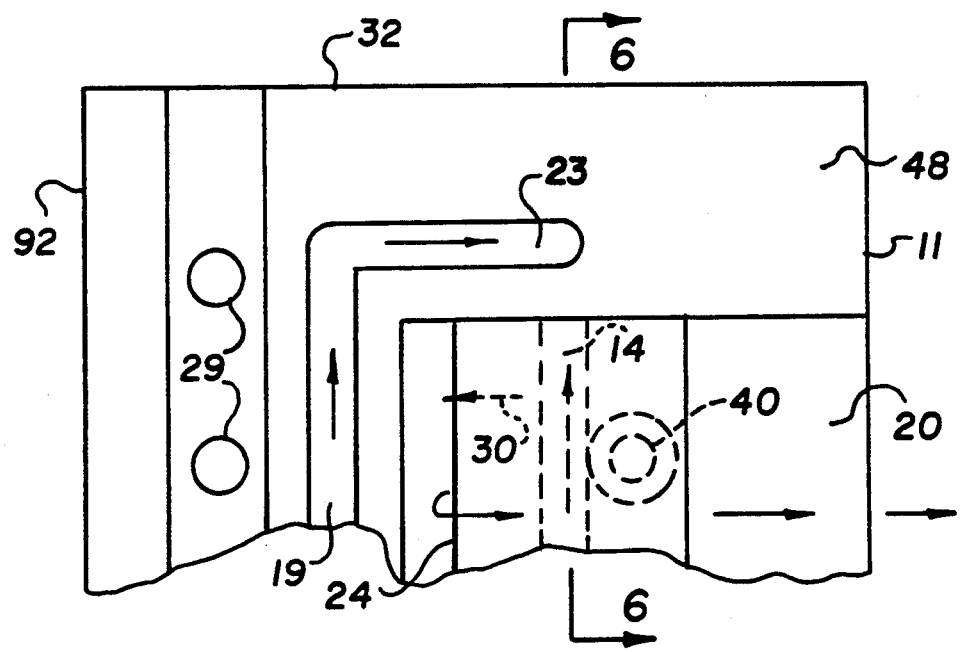
FIG. 4 shows an enlarged face view of the partial body-half of the hopper of the present invention.

An insert design arrangement for a criss-cross hopper is shown in FIGS. 1–6. The numbering of the elements in each of FIGS. 1–6 is the same. FIG. 1 shows a face view of the body piece 11 and cover piece 10. FIG. 2 is an enlarged view of an end section of the body piece 11. FIG. 3 shows the body piece 11 and cover piece 10 connected together, preferably by bolts 29. The body piece 11 and cover piece 10 form a main cavity 51. The main cavity 51 is in fluid communication with delivery slot 13 which is bounded by planar surfaces 20 and 21 on the body and cover piece. The delivery slot is formed at the exit end of the hopper.

Fluid is supplied through passageway 90 in body 11 positioned at the entrance end 92 of the hopper. Passageway 90 connects to delivery cavity 19. Delivery cavity 19 splits the flow in half and is formed in the land area 18 (FIGS. 1 and 2) of the main body piece 11 and land area 48 (FIGS. 1 and 4) of the cover piece 10 and not in the distribution cavity as described in U.S. patent application Ser. No. 08/098,179 filed Jul. 28, 1993.

Inserts 24 and 25 are secured to the body and cover pieces within the main cavity 51. The inserts 24 and 25 are mounted to the body and cover piece by blind screws 40. The inserts form slots 42 and 43 within the main cavity 51.

Figure 5:
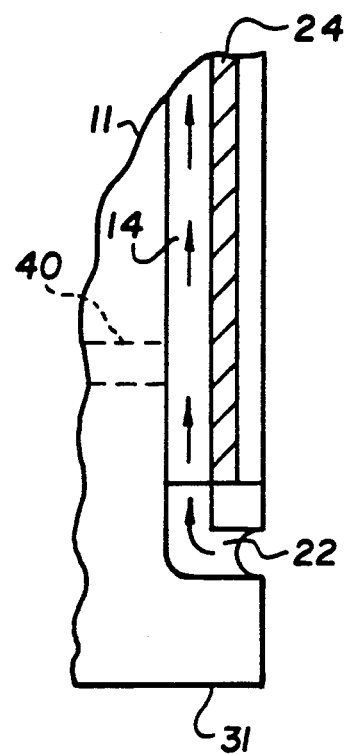
FIG. 5 is a view along line 5—5 of FIG. 2.
Figure 6:
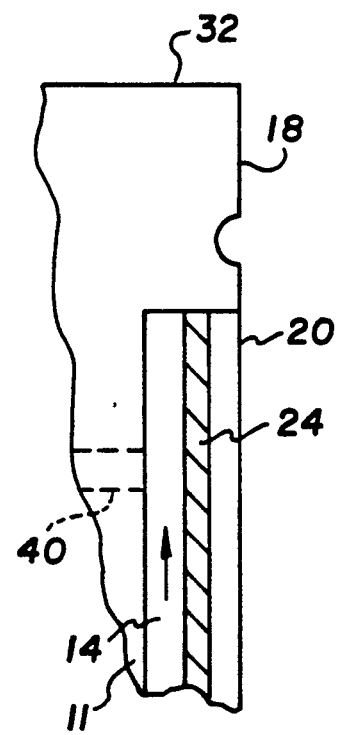
FIG. 6 is a view along line 6—6 of FIG. 4.

A damping chamber 30 is formed within the main cavity which is bounded by the outer surfaces of the inserts. Fluid is supplied to the slots 42 and 43 by the tapered half flow distribution channels 14, 15 which are contained in the inserts 24, 25. Passages 22 and 23 connect the delivery cavity 19 to the tapered half flow distribution channels 14, 15 at opposite sides 31, 32 of the hopper. This is shown clearly in FIGS. 2, 4, 5 and 6 which show enlarged views of each side 31, 32 of the body piece 11. At end 31 in FIG. 2, the delivery cavity 19 is connected to the widthwise distribution channel 14. FIG. 5 shows that passage 22 is in fluid communication with distribution channel 14. FIG. 6 shows that distribution channel 14 is bounded by the insert 24 and the wall of the body piece.

Flow of the fluid in the hopper proceeds through passageway 90 where it is split in cavity 19 with half the fluid flowing toward one side 31 of the hopper and half flowing towards the other side 32 of the hopper. Passages 22 and 23 connect each half flow in cavity 19 with the widthwise distribution channels 14 and 15. The fluid is then directed toward the entrance end 92 of the hopper through slots 42 and 43 on each side of the hopper. The flows from each slot 42 and 43 merge and are directed toward the exit end through damping chamber 30 and delivery slot 13.

The impinging and reversing of the half flows also provides improved distribution in that any uneven momentum will be redistributed when the flow is turned at the entrance end of the hopper where the two flows impinge. Current art teaches, whether end fed or center fed, a single continuous flow path so that flow impingement is not possible. Current art does teach the advantage of momentum distribution by adding internal slots for impingement of fluid and hopper parts, but not fluid opposed to fluid as shown by this invention.

The inserts can be easily removed and replaced. This facilitates cleaning the hopper cavities. The cleaning can be done by scrubbing and can be visually inspected.

The inserts can be made of titanium or some material as the hopper body and cover for maximum accuracy.

Placing the delivery cavity 19 in the land areas of the body 11 and cover 10 make it accessible to easy cleaning upon removal of the cover 10. The delivery cavity is machined in equal halves in the body 11 and the cover 10. Sealing of the delivery cavity is ensured by locating it in the land areas 18, 21 which must be compressed when the cover 10 is bolted to the body.

While there has been shown and described what are at present considered the preferred embodiments of the invention, it will be obvious to those skilled in the art that various changes, alterations and modifications may be made therein without departing from the scope of the invention.

What is claimed is:

1. A criss-cross flow hopper comprising:
   a first hopper half having a first planar surface, the planar surface adjoining a first cavity having an exit end and an entrance end;
   a second hopper half having a second planar surface, the planar surface adjoining a second cavity having an exit end and an entrance end wherein said first and second hopper halves cooperate to form an exit slot bounded by the first and second planar surfaces and a chamber bounded by the first and second cavities;
   a first insert having a first side having a widthwise distribution channel and a second side, the first side of said first insert securable to a surface of the first cavity wherein a first slot is formed bounded by the surface of the first cavity and the first side of said first insert when said first insert is secured to the surface of said first cavity;
   a second insert having a first side having a widthwise distribution channel and a second side, the first side of said second insert securable to a surface of the second cavity wherein a second slot is formed bounded by the surface of the second cavity and the first side of said second insert when said second insert is secured to the surface of the second cavity;
   wherein said first and second inserts are not in contact and cooperate to form a damping chamber bounded by the second side of said first insert and the second side of said second insert, the damping chamber is in fluid communication with the first and second slots and the exit slot such that when liquid flows through the first and second widthwise distribution channels the liquid is directed toward the entrance end through the first and second slots and then the liquid combines in the damping chamber where it is directed toward the exit and through the exit slot.

2. The hopper according to claim 1 further comprising:
   fluid supply means formed from said cooperating first and second hopper halves which create a first delivery channel in fluid communication with the first widthwise and a second delivery channel in fluid communication with the second widthwise distribution channel.

3. The hopper according to claim 2 wherein the fluid supply means includes a passage way in the first hopper half.

4. The hopper according to claim 1 wherein the first distribution channel tapers from a first side of the hopper to a second side of the hopper and the second distribution channel tapers from the second side of the hopper to the first side of the hopper.

5. The hopper according to claim 1 wherein the first and second inserts comprise titanium or the same material as is comprised by body and cover.

6. The hopper according to claim 1 wherein said first and second hopper halves are held together by bolts.

* * * * *